(12) United States Patent
Zeadan et al.

(10) Patent No.: US 11,183,906 B2
(45) Date of Patent: Nov. 23, 2021

(54) LASER WELDING METHOD FOR STATOR

(71) Applicant: Robert Bosch GmbH, Stuttgart (DE)

(72) Inventors: Jeihad Zeadan, Tilburg (NL); Steffen Jacob, Hannover (DE); Tobias Hein, Gronau (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 16/461,107

(22) PCT Filed: Sep. 12, 2017

(86) PCT No.: PCT/EP2017/072906
§ 371 (c)(1),
(2) Date: May 15, 2019

(87) PCT Pub. No.: WO2018/091162
PCT Pub. Date: May 24, 2018

(65) Prior Publication Data
US 2020/0067388 A1 Feb. 27, 2020

(30) Foreign Application Priority Data
Nov. 15, 2016 (DE) .................... 10 2016 222 385.2

(51) Int. Cl.
*H02K 15/00* (2006.01)
*H02K 3/12* (2006.01)
*B23K 26/21* (2014.01)

(52) U.S. Cl.
CPC ......... *H02K 15/0081* (2013.01); *B23K 26/21* (2015.10); *H02K 3/12* (2013.01)

(58) Field of Classification Search
CPC ................. H02K 3/12; H02K 15/00
(Continued)

(56) References Cited

U.S. PATENT DOCUMENTS 6,462,453 B1 * 10/2002 Asao ................. H02K 3/12
310/179
2002/0041129 A1 * 4/2002 Oohashi ............. H02K 15/0081
310/179
(Continued)

FOREIGN PATENT DOCUMENTS

CN 102282745 A 12/2011
CN 105743259 A 7/2016
(Continued)

OTHER PUBLICATIONS

International Search Report for Application No. PCT/EP2017/072906 dated Dec. 1, 2017 (English Translation, 2 pages).

*Primary Examiner* — Jose A Gonzalez Quinones
(74) *Attorney, Agent, or Firm* — Michael Best & Friedrich LLP

(57) ABSTRACT

The invention relates to a stator (10) for an electric machine comprising a stator package (12); a stator winding, which comprises a plurality of rod-shaped conductors (16a, 16b), which are inserted through the stator package (12) in an axial direction (A); wherein at least one first conductor (16b) and an adjacent second conductor (16b) of the plurality of conductors are electrically connected to each other on an end face (20) of the stator package (12) by means of a bridge (34) formed by laser welding; wherein the bridge (34) formed by laser welding extends at an angle to the axial direction (A) between the conductor ends (18a, 18b) of the first conductor (16a) and the second conductor (16b).

14 Claims, 3 Drawing Sheets

(58) Field of Classification Search
USPC .................................. 310/179, 208; 29/596
See application file for complete search history.

(56) References Cited

U.S. PATENT DOCUMENTS

| | | | |
|---|---|---|---|
| 2014/0210298 A1 | 7/2014 | Tamura | |
| 2014/0225465 A1* | 8/2014 | Goto | H02K 3/28 310/71 |
| 2014/0338183 A1* | 11/2014 | Nishiyama | H02K 15/085 29/596 |
| 2016/0008911 A1* | 1/2016 | Schroth | B23K 9/042 219/78.02 |

FOREIGN PATENT DOCUMENTS

| | | | | |
|---|---|---|---|---|
| CN | 106104976 A | 11/2016 | | |
| DE | 102006019314 | 10/2007 | | |
| DE | 102006019314 A1 * | 10/2007 | ......... | H02K 15/0081 |
| JP | 2010200462 | 9/2010 | | |
| WO | 2016067981 | 5/2016 | | |

\* cited by examiner

LASER WELDING METHOD FOR STATOR

BACKGROUND OF THE INVENTION

The invention relates to a stator for an electric machine and to a method for producing a stator.

Stators can be constructed using plugging technology. In this case, rod-shaped conductors made of copper are generally plugged into grooves in a stator stack and the conductor ends of said conductors are then welded to form a stator winding. For example, CMT (cold metal transfer) welding, resistance welding or tungsten inert gas welding are used here. These methods are preferably used in the case of specific problems and usually with low quantities.

When manufacturing high quantities, laser beam welding is often used on account of high possibilities for automation and low cycle times. The laser beam welding of copper presents particular challenges for the manufacture of electric machines.

In the conventional design of a welding installation, the components to be welded are placed vertically next to one another on a working plane or a conveyor belt and the laser beam is directed perpendicularly or vertically to the working plane or conveyor belt. Coupling the laser beam into the material produces a melt, which leads to the components being connected to one another. In order to prevent damage to the laser source due to feedback effects, an oblique positioning of the laser beam or the components by at most 0-15° to one another is required depending on the manufacturer of the laser source.

SUMMARY OF THE INVENTION

Embodiments of the present invention can advantageously make it possible to weld rod-shaped conductors of a stator to one another with a particularly large spacing from one another in an efficient and fault-free manner.

Ideas regarding embodiments of the present invention can be considered, inter alia, as based on the concepts and knowledge described in the following text.

One aspect of the invention relates to a stator for an electric machine. An electric machine may be an electric motor or a generator. For example, the electric machine may be a constituent part of a drive of a vehicle, such as, for instance, an automobile, truck, bus or motorcycle.

According to one embodiment of the invention, the stator comprises a stator stack; a stator winding, which comprises a plurality of rod-shaped conductors plugged through the stator stack in an axial direction, wherein at least one first conductor and an adjacent second conductor from the plurality of conductors are electrically connected to one another at a front side of the stator stack by means of a bridge formed by laser welding. The rod-shaped conductors can be made of copper, for example. The stator can be constructed by means of plugging technology, in which the rod-shaped conductors are plugged into axial grooves of the stator stack. The rod-shaped conductors are electrically and mechanically connected at their conductor ends by means of laser welding to form the stator winding.

As described further below, the stator and, in particular, the bridges between two or more conductor ends of the rod-shaped conductors can be produced by a specific method, in which the conductor ends are inclined in relation to a perpendicular direction. This leads to the bridge formed by laser welding running between the first conductor and the second conductor obliquely to the axial direction.

In particular, the melt that forms the bridge may be a melt that is asymmetrical with respect to a central plane between the two conductor ends and/or a loop-shaped melt, said melt having a stamped formation in the perpendicular direction. In particular, in the case of two conductors or conductor ends, the melt can be formed asymmetrically in the perpendicular direction by means of the components. In contrast thereto, a conventional connection may be droplet-shaped.

According to one embodiment of the invention, the first conductor and the second conductor or the conductor ends thereof are spaced apart from one another by more than 0.2 mm and/or less than 2 mm in the region of the bridge. In other words, a gap can be located between the two conductors or the conductor ends thereof. In the case of an overall width or an outer spacing of the two conductor ends that is to be connected of, for example, 6.4 mm, a single gap of more than 0.2 mm and of up to 1.8 mm wide can be bridged.

According to one embodiment of the invention, the bridge is inclined by more than 10° in relation to an orthogonal with respect to the axial direction. Since, in the case of the laser welding method, the stator and, in particular, the conductor ends are oriented obliquely with respect to a perpendicular direction, that is to say a vertical direction, this leads to the melt, which follows the force of gravity downward, running obliquely to the axial direction of the stator. In this way, the bridge at which the melt solidifies can run obliquely to the axial direction of the stator.

According to one embodiment of the invention, the bridge connects adjacent conductor ends of a third and/or fourth conductor to the conductor ends of the first and of the second conductor. Overall, two, three or more adjacent conductors or the conductor ends thereof can be connected by the bridge formed by means of laser welding. When a plurality of conductor ends are connected to one another, such as, for example, four wires each with a width of 1.6 mm, which leads to a total width of 6.4 mm, a total gap of up to 2.0 mm can be bridged. This can be independent of whether a single gap or a plurality of gaps are involved.

According to one embodiment of the invention, the conductors are connected to one another in such a way that insulations of the two conductor ends underneath the bridge are free of damage. Since the laser beam is inclined with respect to an axial direction of the conductors or the conductor ends, it penetrates less far into the gap than if it were oriented virtually parallel to the conductors or the conductor ends thereof. Therefore, adjacent components in the beam direction, such as, for instance, an insulation, a winding head and/or the stator stack, are not damaged.

According to one embodiment of the invention, the conductive cross section of the bridge is at least 25% of a cross section of one of the two conductor ends measured before the welding. In this way, the stator winding can provide sufficient electrical conductivity.

According to one embodiment of the invention, the conductor ends are arranged substantially in parallel. In other words, the gap between the conductor ends can have substantially the same width.

A further aspect of the invention relates to a method for producing a stator for an electric machine, for example a stator, as is described above and below.

According to one embodiment of the invention, the method comprises: providing a stator with a plurality of rod-shaped conductors plugged through a stator stack in an axial direction; laser welding at least one first conductor and one second conductor from the plurality of conductors so that a bridge is formed as an electrical connection between the first conductor and the second conductor; tilting the stator in such a way that conductor ends of the first conductor and of the second conductor are arranged obliquely with respect to a perpendicular direction before the laser welding in terms of time. In this way, the material of the first conductor liquefied by a laser beam can flow in the direction of the second conductor in order to form the bridge.

Using the laser welding method, a gap between the conductors to be welded at the conductor ends thereof can be bridged without damage to adjoining components occurring. The maximum gap that can be bridged depends on a width of the conductor ends, but may be up to 2 mm. The method can be carried out in an automated manner and cost-effectively even though, owing to manufacturing, a gap may be located between the conductors to be welded.

It is also possible for the conductors to be welded to have greater position tolerances and/or for them to be welded without position correction. Faulty welding connections can be reduced since the method is more resilient to differing component dimensioning compared to known methods.

According to one embodiment of the invention, the laser is moved during laser welding so that first the conductor located higher up and then the conductor located lower down are irradiated by the laser beam. It is possible for energy input to first be carried out only in the first conductor located higher up. Energy input can also be carried out later in the second conductor located lower down. The laser and the laser beam can also be moved back and forth.

According to one embodiment of the invention, the stator is tilted in such a way that the conductor ends of the first conductor and of the second conductor are tilted by more than 40°. In this way, the melt formed by the laser beam, that is to say the liquefied material of the upper conductor, can run relatively easily to the second conductor located lower down.

According to one embodiment of the invention, a blasting time and/or a blasting intensity of the laser beam onto the first conductor is set depending on a determined spacing of the first conductor and of the second conductor so that the amount of liquid material generated from the first conductor by the laser beam depends on the spacing of the first conductor from the second conductor. In other words, the amount of melt can be set depending on the width of the gap.

For example, the method can be automated to the effect that the volume of the melt from the upper conductor is adjusted to the gap measurement, that is to say the width of the gap. If there is no gap located between the conductor ends to be welded, a first step for bridging the gap, in which first only the first end is irradiated, can be skipped and the connection of the conductor ends to be welded can be realized directly by covering the two conductors with the laser beam.

According to one embodiment of the invention, the method comprises: determining a spacing between the first conductor and the second conductor by measuring the first conductor and the second conductor, for example using a camera. For example, before the welding, the position and/or the dimensions of the first conductor and/or the second conductor are detected. The upper conductor can be irradiated first. By melting the conductor end of the upper conductor, the melt hangs downward and bridges the gap between the conductor ends. Subsequently, the connection of the two conductors by covering the two conductors with the laser beam can be realized. As a result of the fact that the melt has run into the gap and/or beyond said gap, the laser beam cannot penetrate into the gap, and damage to components lying below is prevented.

It is also possible for the upper conductor end to be irradiated for a different length of time and/or to a different extent depending on the gap size or depending on the spacing between the two conductors or conductor ends. The data necessary for this are identified by recognizing the geometry of the components to be welded before the welding, for example by means of image recognition, and/or reading out the process parameters from a database depending thereon.

If more than two conductors are connected to one another, these conductors can also be connected in one go using the method.

According to one embodiment of the invention, the laser beam is directed onto the first and the second conductor in the perpendicular direction or obliquely with respect to the perpendicular direction. It is possible for the laser beam to be incident on the conductors to be welded in a virtually perpendicular or vertical manner. This may then be the case, for example, when the stator is inclined at 45° to 90° with the axial direction thereof. However, it is also possible for the laser beam to be oriented obliquely with respect to the perpendicular direction by up to 40°.

BRIEF DESCRIPTION OF THE DRAWINGS

Embodiments of the invention are described below with reference to the appended drawings, neither the drawings nor the description being intended to be interpreted as limiting the invention.

The figures are merely schematic and not true to scale. In the figures, identical reference signs denote identical or identically functioning features.

DETAILED DESCRIPTION

Figure 1:
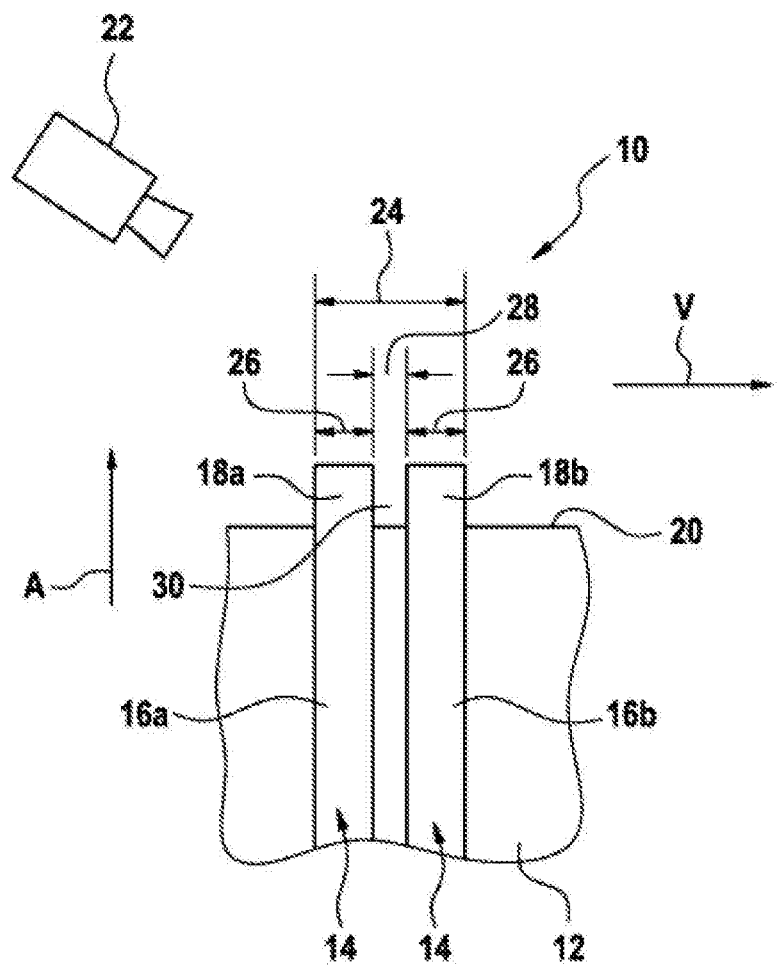
FIG. 1 shows a schematic cross section through a stator according to one embodiment of the invention.

FIG. 1 schematically shows a stator 10, which has a stator stack 12 with stator grooves 14 running axially therein. The axial direction A is determined here by an axis of symmetry of the stator 10, around which the stator is substantially rotationally symmetrical, and/or an axis of rotation of a rotor mounted in the stator 10 so as to be able to rotate. The stator stack 12 can be constructed, for example, of sheet-metal laminates stacked one on top of the other.

Rod-shaped conductors 16a, 16b are plugged into the stator grooves 14, said conductors running in the axial direction A and being produced, for example, from copper. Conductor ends 18a, 18b of the conductors 16a, 16b project out of the stator stack 12 at an end side 20 of the stator stack 12. As described above and below, the conductor ends 18a, 18b are connected by means of a specific laser welding method so that an electrically conductive connection is provided, with the result that the conductor ends 18a, 18b welded to one another form a winding for the stator 10.

FIG. 1 shows a first step of the laser welding method, in which the dimensions of the conductor ends 18a, 18b to be welded are determined. For example, the stator 10 and, in particular, the conductor ends 18a, 18b can be recorded using a camera 22 and the dimensions of the conductor ends that are important for the following method steps can be identified from this data, for example using an image recognition method.

These dimensions can include the outer spacing 24 of the two conductor ends 18a, 18b, the width 26 thereof in a connecting direction V and the spacing 28 thereof in the connecting direction V with respect to one another. The connecting direction is generally the direction in which the two conductor ends 18a, 18b are arranged next to one another. The connecting direction V is generally orthogonal to the axial direction A. The spacing 28 is determined by the width of a gap 30 between the two conductor ends 18a, 18b. Said gap can be bridged particularly efficiently using the welding method.

Figure 2:
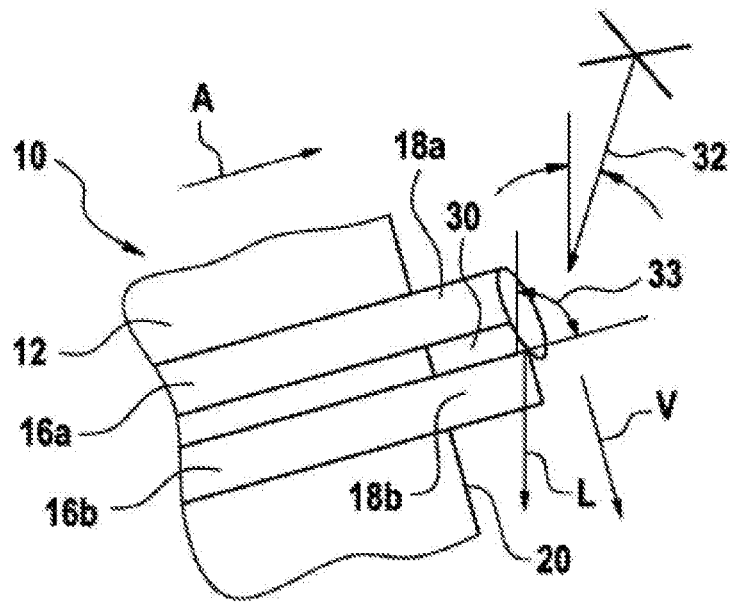
FIG. 2 schematically shows a stator during a method step according to one embodiment of the invention.

FIG. 2 shows a further method step, in which the laser welding is started. The stator 10 is tilted with respect to a perpendicular direction L, which is defined by the force of gravity. For example, the stator 10 can be inclined at 45° to 90° with the axial direction thereof with respect to the perpendicular direction L. In particular, the conductor ends 18a, 18b are oriented at this angle 33 with respect to the perpendicular direction L.

The laser beam 32 is first directed onto the first conductor end 18a, arranged higher up, of the first conductor 16a. In this case, it may be that the laser beam 32 is directed onto the conductor ends 18a, 18b substantially perpendicularly. However, it is also possible for the laser beam 32 to be oriented obliquely with respect to the perpendicular direction L by up to 40°.

This also achieves a situation in which the laser beam 32 cannot penetrate deep into the gap 30 and cannot damage components of the stator 10, such as, for instance an insulation etc., that are arranged deeper in the gap 30.

The blasting time and/or the blasting intensity of the laser beam 32 onto the first conductor end 18a can be set depending on the spacing 28, that is to say the width of the gap 30, with the result that so much melt is generated that the bridge 36, which is formed between the two conductor ends 18a, 18b, obtains a sufficient thickness in order to bridge the gap 30 with a sufficient amount of material.

As shown in FIG. 2, the melt, that is to say the material liquefied by the laser beam 32, runs in the perpendicular direction L in the direction of the second conductor end 18b, arranged further below, of the second conductor 16b and then onto the second conductor end 18b.

Figure 3:
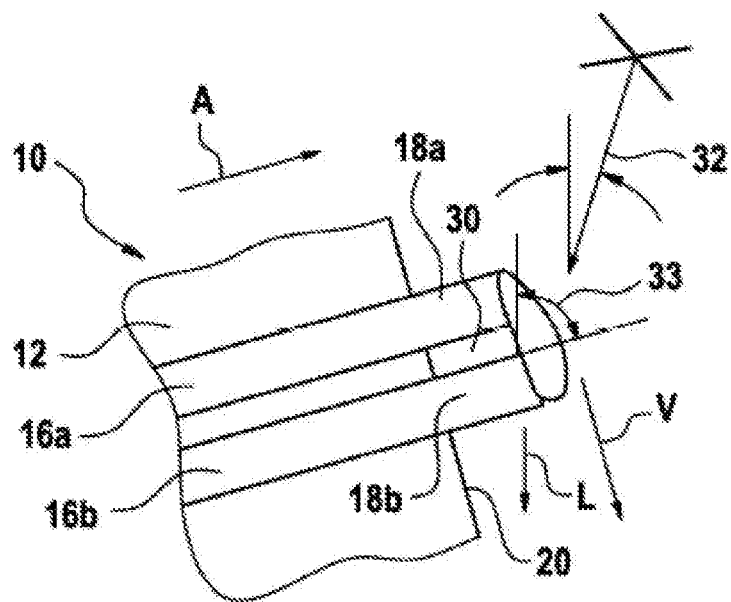
FIG. 3 schematically shows a stator during a further method step according to one embodiment of the invention.

FIG. 3 shows a further method step, in which the laser welding is terminated. The laser beam is then moved along the connecting direction V so that the second conductor end 18b is also melted, with the result that the melt can be connected to the two conductor ends 18b. It is also possible for the laser beam 32 to be moved back and forth between the two conductor ends 18a, 18b in this method step.

After the laser beam 32 has been switched off, the melt solidifies to form the bridge 34.

Figure 4:
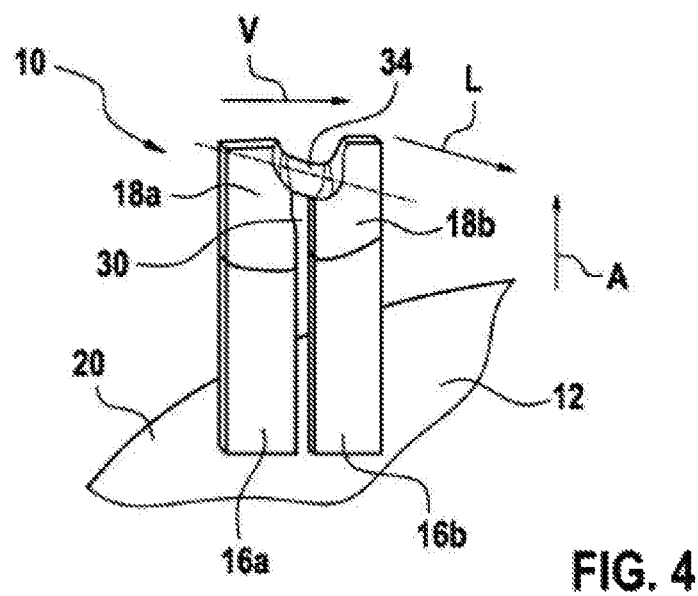
FIG. 4 shows a perspective view of welded conductor ends of a stator according to one embodiment of the invention.

FIG. 4 shows an example of a bridge formed using the laser welding method between two conductor ends 18a, 18b. The bridge 34 formed by laser welding between the conductor ends 18a, 18b runs obliquely to the axial direction A at an angle of approximately 15° obliquely to an orthogonal with respect to the axial direction A or the connecting direction V.

It has been found that a bridge 34 with greater reliability can be produced, even if the two conductor ends 18a, 18b are spaced apart from another by more than 0.2 mm and up to a spacing of 2 mm.

It can furthermore be seen in FIG. 4 that it is possible to design the conductive cross section of the bridge 34 to be so large that it is at least 25% of a cross section of one of the two conductors 16a, 16b measured before the welding.

Figure 5:
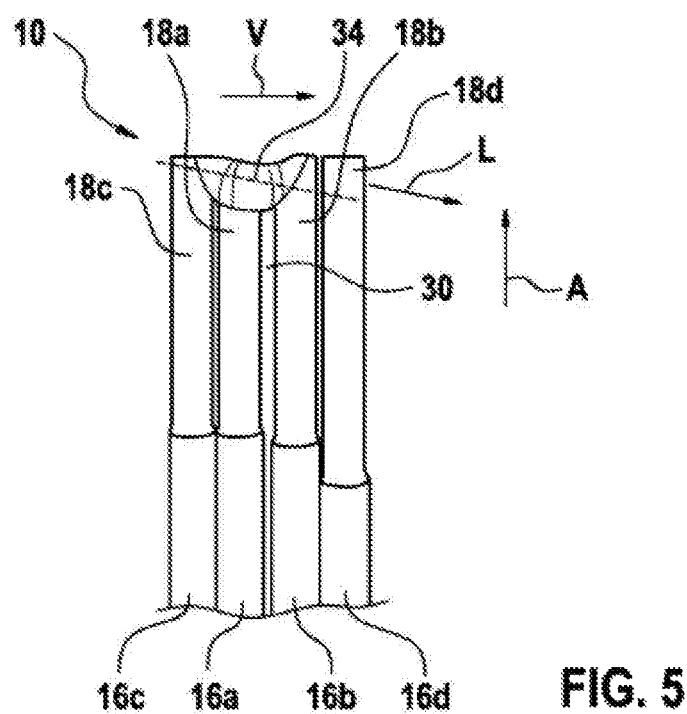
FIG. 5 shows a perspective view of welded conductor ends of a stator according to a further embodiment of the invention.

FIG. 5 shows that also more than two conductors 16a to 16d or more than two adjacent conductor ends 18a to 18d can be welded to one another. The bridge 34 can then electrically connect all of these conductor ends 18a to 18d to one another. For example, as shown in FIG. 5, the adjacent conductor ends 18c, 18d of a third conductor 16c and a fourth conductor 16d can be connected to the conductor ends 18a, 18b of a first conductor 16a and a second conductor 16b. In this case, a gap 30 may be located between the first conductor end 18a and the second conductor end 18b. It is also possible for a gap to be located between the third conductor end 18c and the first conductor end 18a and/or between the fourth conductor end 18d and the second conductor end 18b.

Finally, it should be pointed out that terms such as "having", "comprising", etc. do not exclude other elements or steps and terms such as "a" or "an" do not exclude a multiplicity. Reference signs in the claims are not intended to be regarded as limitation.

The invention claimed is:

1. A stator (10) for an electric machine, the stator (10) comprising:
    a stator stack (12);
    a stator winding, which comprises a plurality of rod-shaped conductors (16a, 16b) plugged through the stator stack (12) in an axial direction (A);
    wherein at least one first conductor (16a) and an adjacent second conductor (16b) from the plurality of conductors are electrically connected to one another at a front side (20) of the stator stack (12) by a bridge (34) formed by laser welding;
    characterized in that the bridge (34) formed by laser welding runs between ends (18a, 18b) of the first conductor (16a) and of the second conductor (16b) obliquely to the axial direction (A),
    wherein the ends (18a, 18b) of the first conductor (16a) and of the second conductor (16b) protrude from the stator stack (12) at the front side (20) of the stator stack (12), wherein the ends (18a, 18b) of the first conductor (16a) and of the second conductor (16b) are arranged in parallel, and wherein the first conductor (16a) and the second conductor (16b) are spaced apart from one another by more than 0.2 mm and less than 2 mm in the region of the bridge (34).

2. The stator (10) as claimed in claim 1, wherein the bridge (34) is inclined by more than 10° in relation to an orthogonal (V) with respect to the axial direction (A).

3. The stator (10) as claimed in claim 1, wherein the bridge (34) connects adjacent ends (18c, 18d) of a third and/or fourth conductor (16c, 16d) to the ends (18a, 18b) of the first conductor (16a) and of the second conductor (16b).

4. The stator (10) as claimed in claim 1, wherein the conductors (16a, 16b) are connected to one another in such a way that insulations of the two conductors (16a, 16b) underneath the bridge (34) are free of damage.

5. The stator (10) as claimed in claim 1, wherein a conductive cross section of the bridge (34) is at least 25% of a cross section of one of the two conductors (16a, 16b) measured before welding.

6. A method for producing a stator (10) for an electric machine, the method comprising:
   providing a stator (10) with a plurality of rod-shaped conductors (16a, 16b) plugged through a stator stack (12) in an axial direction (A), wherein ends (18a, 18b) of the conductors (16a, 16b) protrude from the stator stack (12) at a front side (20) of the stator stack (12), wherein the plurality of rod-shaped conductors (16a, 16b) includes a first conductor (16a) and a second conductor (16b), and wherein the ends (18a, 18b) of a first conductor (16a) and of a second conductor (16b) are arranged in parallel,
   laser welding with a laser beam (32) of a laser at least one first conductor (16a) and one second conductor (16b) from the plurality of conductors so that a bridge (34) is formed as an electrical connection between the first conductor (16a) and the second conductor (16b); wherein the first conductor (16a) and the second conductor (16b) are spaced apart from one another by more than 0.2 mm and less than 2 mm in the region of the bridge (34), wherein the laser (32) is moved during laser welding so that first the first conductor (16a) and then the second conductor (16b) are irradiated by the laser beam (32), and
   tilting the stator (10) in such a way that the ends (18a, 18b) of the first conductor (16a) and of the second conductor (16b) are arranged obliquely with respect to a vertical direction (L) before the laser welding, with the result that material of the first conductor (16a) liquefied by the laser beam (32) flows in the direction of the second conductor (16b) in order to form the bridge (34) and to prevent the laser beam (32) from penetrating into a gap between the first conductor (16a) and the second conductor (16b).

7. The method as claimed in claim 6, wherein the laser (32) is moved during laser welding so that first the first conductor (16a) and then the second conductor (16b) are irradiated by the laser beam (32).

8. The method as claimed in claim 6, wherein the stator (10) is tilted in such a way that the ends (18a, 18b) of the first conductor (16a) and of the second conductor (16b) are tilted by more than 40°.

9. The method as claimed in claim 6, wherein a blasting time and/or a blasting intensity of the laser beam (32) onto the first conductor (16a) is set depending on a determined spacing of the first conductor (16a) and of the second conductor (16b) so that an amount of liquid material generated from the first conductor (16a) by the laser beam (32) depends on the spacing (28) of the first conductor (16a) from the second conductor (16b).

10. The method as claimed in claim 6, wherein the laser beam (32) is directed onto the first and the second conductor (16a, 16b) in the vertical direction (L) or obliquely with respect to the vertical direction (L).

11. The method as claimed in claim 6, wherein the bridge (34) is inclined by more than 10° in relation to an orthogonal (V) with respect to the axial direction (A).

12. The method as claimed in claim 6, wherein the bridge (34) connects adjacent ends (18c, 18d) of a third and/or fourth conductor (16c, 16d) to the ends (18a, 18b) of the first conductor (16a) and of the second conductor (16b).

13. The method as claimed in claim 6, wherein the conductors (16a, 16b) are connected to one another in such a way that insulations of the two conductors (16a, 16b) underneath the bridge (34) are free of damage.

14. The method as claimed in claim 6, wherein a conductive cross section of the bridge (34) is at least 25% of a cross section of one of the two conductors (16a, 16b) measured before welding.

* * * * *